United States Patent
Schwabe (10) Patent No.: US 12,074,430 B2
(45) Date of Patent: Aug. 27, 2024

(54) METHOD AND APPARATUS FOR ESTIMATING STRESS ON CAPACITOR

(71) Applicant: Infineon Technologies Austria AG, Villach (AT)

(72) Inventor: Benjamin Schwabe, Munich (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 273 days.

(21) Appl. No.: 17/577,191

(22) Filed: Jan. 17, 2022

(65) Prior Publication Data

US 2023/0231376 A1 Jul. 20, 2023

(51) Int. Cl.
H02H 7/12 (2006.01)
H02H 1/00 (2006.01)

(52) U.S. Cl.
CPC ............ *H02H 7/12* (2013.01); *H02H 1/0007* (2013.01)

(58) Field of Classification Search
CPC .............................. H02H 7/12; H02H 1/0007
USPC ............................................................ 361/18
See application file for complete search history.

(56) References Cited

U.S. PATENT DOCUMENTS

| | | | | |
|---|---|---|---|---|
| 9,748,852 B2 * | 8/2017 | Freeman | ............ | H02M 3/33553 |
| 2006/0202640 A1 * | 9/2006 | Alexandrov | ......... | H05B 47/185 |
| | | | | 315/291 |
| 2007/0040516 A1 * | 2/2007 | Chen | .................... | H05B 39/045 |
| | | | | 315/291 |
| 2008/0002444 A1 * | 1/2008 | Shekhawat | ............. | H02M 1/34 |
| | | | | 363/127 |
| 2008/0197910 A1 * | 8/2008 | Isomura | ............. | B60H 1/00428 |
| | | | | 327/520 |
| 2008/0284449 A1 * | 11/2008 | Phadke | .................... | H02M 1/32 |
| | | | | 324/548 |
| 2015/0032314 A1 * | 1/2015 | Kitamura | .............. | B60W 20/10 |
| | | | | 180/65.28 |
| 2020/0178372 A1 * | 6/2020 | Benning | .............. | H05B 39/048 |

FOREIGN PATENT DOCUMENTS

| | | | |
|---|---|---|---|
| JP | 2013078172 A | 4/2013 | |
| WO | WO-2008139285 A2 * | 11/2008 | ............. G01R 31/40 |

OTHER PUBLICATIONS

European Patent Office; Extended European Search Report relating to Corresponding Application No. EP 23151804.4; May 31, 2023; 9 Pgs.

* cited by examiner

*Primary Examiner* — Yemane Mehari
(74) *Attorney, Agent, or Firm* — Cooper Legal Group LLC (57) ABSTRACT

A method and apparatus for estimating stress on capacitor is provided. A power converter may include an input terminal for receiving an input voltage, a power stage coupled to the input terminal, a capacitor coupled to the power stage, a controller configured to control the power stage to generate an output voltage at the capacitor as a function of the input voltage, and a stress monitor module. The stress monitor module is configured to determine a stress energy metric for the capacitor based on variations in the output voltage and identify a first fault condition based on the stress energy metric.

20 Claims, 4 Drawing Sheets

METHOD AND APPARATUS FOR ESTIMATING STRESS ON CAPACITOR

TECHNICAL FIELD

The present disclosure relates to the field of regulated power conversion.

BACKGROUND

Various types of devices may utilize electric power converters that convert one form of electric energy to another, such as by changing a voltage of the electric energy. Some electric power converters are configured to regulate an output voltage and/or an output current at an output.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment, a power converter is provided. The power converter may comprise an input terminal for receiving an input voltage, a power stage coupled to the input terminal, a capacitor coupled to the power stage, a controller configured to control the power stage to generate an output voltage at the capacitor as a function of the input voltage, and a stress monitor module configured to determine a stress energy metric for the capacitor based on variations in the output voltage and identify a first fault condition based on the stress energy metric.

In an embodiment, an apparatus is provided. The apparatus may comprise means for receiving an input voltage at an input terminal of a power converter, means for controlling a power stage coupled to the input terminal to generate an output voltage as a function of the input voltage at a capacitor coupled to the power stage, means for determining a stress energy metric for the capacitor based on variations in the output voltage, and means for identifying a first fault condition based on the stress energy metric.

In an embodiment, a method is provided. The method may comprise receiving an input voltage at an input terminal of a power converter, controlling a power stage coupled to the input terminal to generate an output voltage as a function of the input voltage at a capacitor coupled to the power stage, determining a stress energy metric for the capacitor based on variations in the output voltage, and identifying a first fault condition based on the stress energy metric.

In an embodiment, an apparatus is provided. The apparatus may comprise means for determining a first stress energy parameter representing power dissipated in a capacitor for a first time interval, means for determining a second stress energy parameter representing power dissipated in the capacitor for a second time interval, means for combining the first stress energy parameter and the second stress energy parameter to generate a stress energy metric for the capacitor, and means for controlling a power converter coupled to the capacitor based on the stress energy metric.

In an embodiment, a method is provided. The method may comprise determining a first stress energy parameter representing power dissipated in a capacitor for a first time interval, determining a second stress energy parameter representing power dissipated in the capacitor for a second time interval, combining the first stress energy parameter and the second stress energy parameter to generate a stress energy metric for the capacitor, and controlling a power converter coupled to the capacitor based on the stress energy metric.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

The term "power converter" as used herein broadly refers to any type of power converter or voltage regulator (VR) that provides one or more regulated voltages to one or more electronic loads such as an Ethernet switch, an Ethernet router, an ASIC (application-specification integrated circuit), a memory device, a processor such as a central processing unit (CPU), a microprocessor, a graphics processing unit (GPU), a digital signal processor (DSP), an artificial intelligence (AI) accelerator, an image processor, a network or packet processor, a coprocessor, a multi-core processor, a front-end processor, a baseband processor, a field programmable gate array (FPGA), a lighting element, a power tool, a vehicle, a motor, or some other suitable load. For example, the power converter may be a buck converter, a boost converter, a buck-boost converter, a switched capacitor voltage regulator, a step-down converter, a two inductor, two capacitor (CLLC) converter, a resonant converter, etc.

The term "power converter" as used herein means a functional assembly, such as a packaged functional assembly, that includes a power stage with a switching circuit used in converting a voltage from one level to another level, e.g., as in power conversion and voltage regulation. The power converter may include a power controller for driving the power stage. The power controller is configured to control the power stage to reduce a voltage error of the output voltage, such as a difference between the output voltage and a target voltage, or to control a current error of the output current, such as a difference between the output current and a target current. Described next in more detail are various embodiments of the power converter, a method of controlling the power converter, and an electronic system that includes the power converter.

In some embodiments, the output terminal of the power converter is connected to a capacitor. The output voltage may correspond to a voltage of the capacitor. In a multiple stage power converter, each stage may have a capacitor, where the capacitor at the output of a first stage serves as an input to a second stage. In some embodiments, the power converter estimates thermal stress on the capacitor and generates an alert or modifies one or more parameters used by the power converter based on the estimated thermal stress.

In some embodiments, an apparatus comprises a circuit board, wherein elements of the power device module, such as the regulated power converter, the control engine, the parameter control system and/or the load are operatively coupled to the circuit board. The regulated power converter, the control engine, and/or the parameter control system may be affixed to and/or fabricated on the circuit board.

Figure 1:
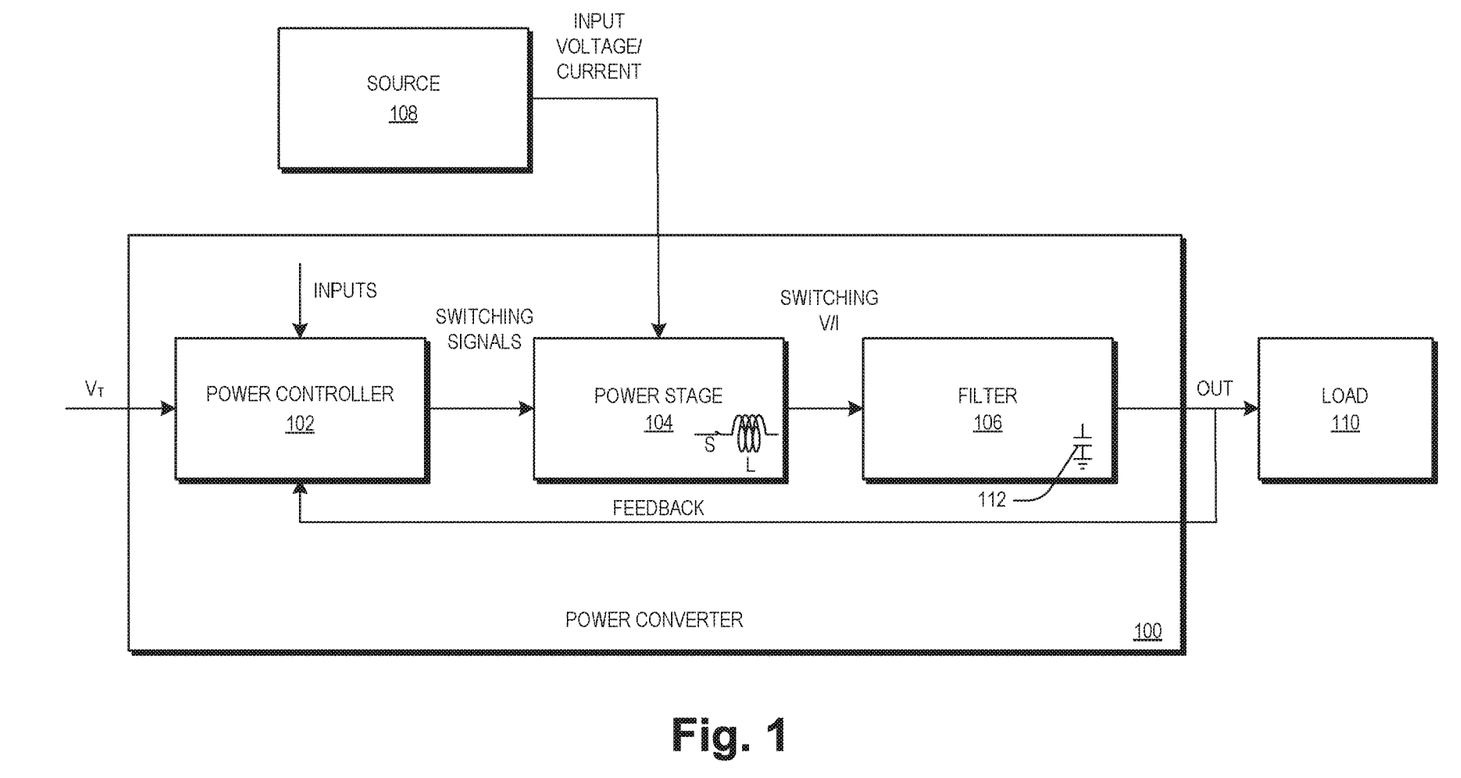
FIG. 1 is a component block diagram of a power device module, according to some embodiments.

FIG. 1 illustrates a power converter 100 according to some embodiments. The power converter 100 comprises a power controller 102, a power stage 104, and a filter 106. The power controller 102 receives a target voltage parameter, $V_T$, and controls the power stage 104 to convert electrical energy from a source 108 to generate an output signal, OUT, for the load 110. The output signal may be an output voltage, $V_{OUT}$, an output current, $I_{OUT}$, or both. The filter 106 includes one or more filtering components to smooth the output of the power stage 104 to generate the output signal. For example, the filter 106 includes a capacitor 112.

The source 108 provides an input current, $V_{IN}$ and an input voltage, $I_{IN}$ to the terminals of the power stage 104. In some embodiments, the power controller 102 employs a buck topology, where the voltage of the source 108 is greater than the target voltage, $V_T$. Other topologies, such as boost or buck-boost may be used. The power controller 102 employs the target voltage, $V_T$, and a feedback signal representative of the output signal, OUT, and generates a control signal that is modulated (e.g., pulse width modulated (PWM) or pulse frequency modulated (PFM)) to generate switching signals for the power stage 104. In some embodiments, the power controller 102 collects information from the power stage 104 and the output and monitors the states of the systems, such as with a finite state machine running asynchronously with the power regulation and issues warnings or shuts down the power converter 100 in case of error conditions, such as overcurrent, overvoltage, or some other error condition. The power controller 102 may provide a communication to the outside world such as for telemetry.

In some embodiments, the power stage 104 comprises switching transistors, such as metal-oxide-semiconductor field effect transistors (MOSFETs). The power stage 104 may comprise high side switches and/or low side switches, collectively represented by the switching circuit S, and an inductor L through which current is output to the filter 106. Controlled switching of the switching circuit S results in generation of the output voltage and/or the output current. The switching voltage of the power stage 104 is the voltage between ground and the node connected to the primary side of the inductor, L, the drain of the low side MOSFET and the source of the high side MOSFET. In some embodiments, the switching voltage is a voltage oscillating at a high frequency in a substantially square form between 0V and the input voltage, $V_{IN}$. The power stage 104 may include multiple phases, typically switching out of phase with one another to reduce ripple.

In some embodiments, parameters employed by the power controller 102 may be tuned. Tuning may be accomplished by proportional-integral-derivative (PID) parameter tuning, machine learning tuning, reinforcement learning tuning, or some other tuning process. In some instances, during tuning, control signals may be used that lead to an unstable regulation. Unstable regulation may lead to a situation where the output voltage no longer tracks the target voltage. Voltage regulation typically results in a ripple around the target voltage, and the output voltage may start to oscillate around the target voltage. Such oscillations may slowly decay, remain constant, or may grow with time, for example, in the case where resonance is present in the control loop. In some embodiments, protection circuits that detect undervoltage or overvoltage conditions might be triggered. In the latter case, the voltage protection features may eventually activate, but unstable regulation results in thermal stress on the capacitor 112.

In some embodiments, the capacitor 112 comprises an electrolyte capacitor, especially for higher capacitance applications. Electrolyte capacitors have a polarization and a maximum voltage rating for surge voltages. Thermal stress arising from unstable regulation can cause an electrolyte capacitor to catastrophically fail, such as by exploding. When a voltage at the input of the capacitor 112 is rising, the capacitor 112 is being charged, which means there is a current flowing into the capacitor 112. Conversely, the capacitor 112 is being discharged when the voltage at the input of the capacitor 112 is dropping. For both charging and discharging, some of the energy is transformed into heat, and the amount of energy lost can be estimated based on the equivalent series resistance (ESR) of the capacitor 112. When the output voltage is rapidly oscillating, a significant amount of heat is generated in the capacitor 112, and eventually the electrolyte starts evaporating, damaging the capacitor 112 or sometimes causing the capacitor 112 to explode.

Figure 2:
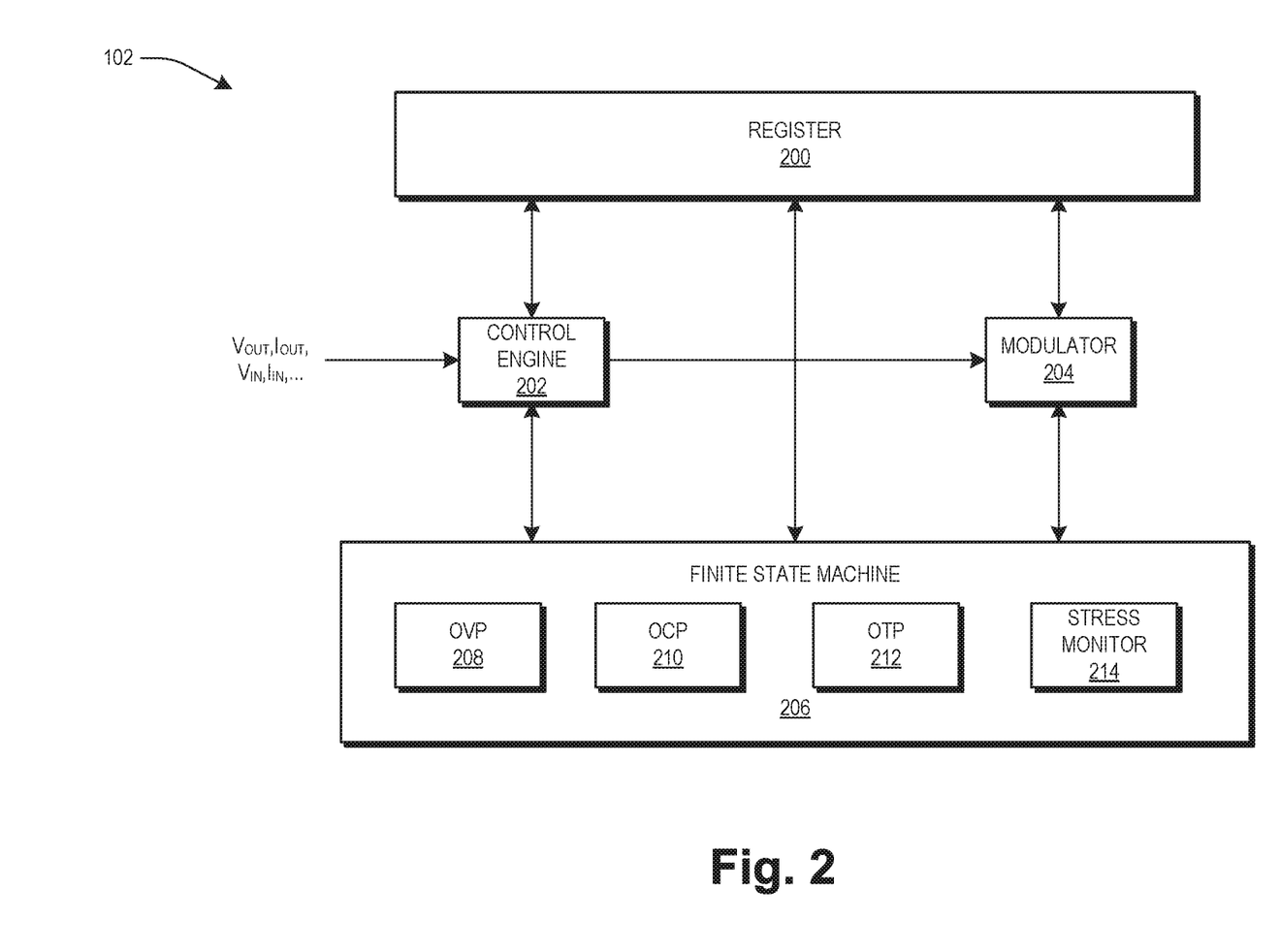
FIG. 2 is a component block diagram illustrating a control engine and a regulated power converter, according to some embodiments.

FIG. 2 illustrates the power controller 102, according to some embodiments. The power controller 102 comprises a register 200, a control engine 202, a modulator 204, and a finite state machine 206.

In some embodiments, the control engine 202 receives feedback signals regarding the output, OUT, and generates signals for controlling the power stage 104. The control engine 202 may implement proportional-integral (PI) control, proportional-integral-derivative (PID) control, or some other control technique. In the case of the multiphase power stage 104, the control engine 202 may generate control signals for each phase. The control engine 202 may employ a feedforward path that incorporates input voltage, $V_{IN}$. In some embodiments, the control engine 202 employs adaptive voltage positioning (AVP) where load current measurements, $I_{OUT}$ are employed to adjust the target voltage, $V_T$. The control engine 202 may be implemented using digital components, analog components, or a combination of analog and digital components with appropriate analog-to-digital converters (ADC) and digital-to-analog converters (DAC).

The modulator 204 receives the control signals from the control engine 202 and generates switching signals for controlling the devices in the power stage 104. The modulator 204 may generate PWM signals, PFM signals, a combination of PWM and PFM signals, or other suitable switching signals.

In some embodiments, the register 200 stores parameter values for the power controller 102, such as regulation parameters for the control engine 202, fault detection thresholds used by the finite state machine 206, or other suitable parameters.

The finite state machine 206 runs asynchronously with respect to the control engine 202 and the modulator 204. The finite state machine 206 enables or disables the control engine 202 and/or the modulator 204 and provides fault detection. In some embodiments, the finite state machine 206 comprises an overvoltage protection (OVP) module 208, and overcurrent protection (OCP) module 210, and over-temperature protection (OTP) module 212, a stress monitor module 214, and any other suitable fault detection modules. The OVP module 208 may monitor the output voltage, VOUT, to identify a fault condition, the OCP module 210 may monitor output current, IOUT, to identify a fault condition, the OTP module 212 may receive an input from a temperature sensor to identify a fault condition, and the stress monitor module 214 may monitor the capacitor 112 in the filter 106 to identify a fault condition.

In some embodiments, tuning of the control engine 202 is performed to determine operating values for the regulation control parameters. The tuning may be performed during a design phase of the power converter 100. In some embodiments, the stress monitor module 214 estimates thermal stress on the capacitor 112 based on accumulated changes in the output voltage feedback signal.

The rising and falling voltage at the output terminal leads to a discharging and charging of the capacitor 112, as the constitutive equation of a capacitor shows:

$$Q=CU, \quad (1)$$

with C denoting the capacitance, U denoting the voltage across the capacitor 112, and Q denoting the charge that is stored by the capacitor 112.

The current that flows in or out of the capacitor 112 is given by the time derivative of equation (1):

$$I=C\dot{U}. \quad (2)$$

Assuming that the ESR of the capacitor 112 results in the electrical energy being transformed into heat, the dissipated power can be formulated as:

$$P=ESRI^2=ESR(C\dot{U})^2. \quad (3)$$

The dissipated power represented by Equation 3 provides a measure of stress on the capacitor 112. Capacitors with a lower ESR dissipate less thermal energy and are thus less affected by thermal stress. Small voltage changes, such as the ripple present on the capacitor 112, may not damage the capacitor 112. However, large voltage oscillations resulting from unstable regulation can damage the capacitor 112 within a short time period. Transient changes in the voltage on the capacitor 112, such as from a transient loadstep, for a stable system introduces less stress than repetitive discharging and charging of the capacitor 112.

In some embodiments, the stress energy that has accumulated in the capacitor 112 over time is represented by the time integral of the power:

$$E(t)=\int_0^t P(s)ds. \quad (4)$$

The stress energy is not entirely cumulative, as the capacitor 112 can dissipate heat, such as in the form of radiation or via thermal conductivity. Stress energy can damage the capacitor 112 when, during a given time interval, the energy dissipated in the capacitor 112 exceeds the energy removable by dissipation causing the capacitor 112 to heat up and eventually evaporate the electrolyte, possibly causing the capacitor 112 to explode.

The stress energy of equation 4 may be modified to generate a stress energy metric for a particular time interval to account for dissipation. The stress energy metric may be defined by:

$$S_h(t)=\int_{t-h}^t P(s)ds=ESRC^2\int_{t-h}^t \dot{U}(s)^2 ds. \quad (5)$$

In some embodiments, the stress monitor module 214 identifies a fault condition and generates an alert flag responsive to the stress energy exceeding a threshold.

$$\text{Alert}=ESRC^2\int_{t-h}^t \dot{U}^2 dt > S_T. \quad (6)$$

Equation 6 may be discretized to simplify the calculation for the stress monitor module 214. The particular discretization process depends on the voltage regulation scheme. In one example, the power converter 100 implements a buck voltage regulation scheme to reduce an input voltage to generate the output voltage using a fixed frequency PWM modulation scheme.

The power of the discretized stress energy of equation 6 can be formulated as:

$$E(t)=\Delta E(t)+E(t-h), \quad (7)$$

where $$\Delta E(t)=ESRC^2\int_{t-h}^t \dot{U}^2(s)ds, \quad (8)$$

and h represents the sampling interval time.

Discretizing the time differential with a forward difference yields:

$$\dot{U}(t) \approx \frac{U(t)-U(t-h)}{h} = \frac{\Delta U(t)}{h}. \quad (9)$$

Applying the trapezoidal rule for discretizing the integral provides the stress energy parameter for a current time interval generated based on a change in voltage on the capacitor 112 over the time interval:

$$\Delta E(t) \approx h\frac{\dot{U}^2(t)+\dot{U}^2(t-h)}{2} \approx \frac{\Delta U^2(t)+\Delta U^2(t-h)}{2h}. \quad (10)$$

Accumulating the stress energy parameters for each interval provides an estimate of the overall stress energy on the capacitor 112. In some embodiments, the energy calculation interval is synchronized with the switching cycle by setting the sampling interval to correspond to the switching frequency, and the standard voltage ripple is filtered out by the discretization in equation 10.

In some embodiments, to address dissipation of the stress energy by the capacitor 112 a weighting factor, γ, is employed to derive a stress energy metric by discounting the previous stress energy metric when adding the current stress energy parameter:

$$E(T)=\Delta E(t)+\gamma E(t-h). \quad (11)$$

The stress energy metric defined by equation 11 represents an exponentially weighted moving average (EWMA) of the stress energy, where the value of the weighting factor, $\gamma$, is selected as a function of the expected energy dissipation by the capacitor 112. For example, the value of the weighting factor, $\gamma$, may be increased if active cooling is provided for the capacitor 112 compared to the value of the weighting factor, $\gamma$, when active cooling is not provided. The stress energy parameter for a current time interval, $\Delta E(t)$, is added to the accumulated stress energy parameters (or the discounted previous value of the stress energy metric, $\gamma E(t-h)$). Thus, when combining a first stress energy parameter representing a current stress energy and a second stress energy parameter representing a previous value of the stress energy, the second stress energy parameter is weighted less than the first stress energy parameter.

Using equation 11 to generate the stress energy metric reduces the complexity of the stress monitor module 214 as the stress monitor module 214 only needs to store the voltage on the capacitor 112 at the beginning and end of the sampling interval, the length of the sampling interval, the value of the previous stress energy metric, and the weighting factor. Since the output voltage feedback signal is already determined for use by the power controller 102 to operate the power stage 104, the stress monitor module 214 introduces very little computational overhead in the power controller 102.

In some embodiments, the stress monitor module 214 identifies fault conditions and generates alert flags based on the stress energy metric exceeding stress thresholds:

$$\text{Alert1}=E(T)>S_{T1} \quad (12)$$

$$\text{Alert2}=E(T)>S_{T2}, \quad (13)$$

where the first alert flag represents a warning condition and the second alert flag represents an action condition. The stress monitor module 214 may set the alert flags in a specific memory location, such as the register 200, and/or send a message to the control module 240 indicating a stress condition. In some embodiments, the stress monitor module 214 applies a dead time period to the fault condition detection. For example, the stress monitor module 214 may identify a first fault condition based on equation 12 and/or a second fault condition based on equation 13 only after the threshold has been violated for a particular time period, such as 10 seconds, 20 seconds, 30 seconds, or some other suitable time period. In some embodiments, the dead time period for the Alert1 flag may differ than the dead time period for the Alert2 flag. A dead time interval avoids fault messages or actions for a steep, single load jump resulting in a fast increase of the load current or a load release resulting in a fast decrease of the load current, which result in spikes or drops in the output voltage.

In some embodiments, responsive to the first alert threshold (Alert1) being violated, the control module 240 generates a fault message identifying the first fault condition, such as an indicator light, a message on a user interface, a message communicated over a communication interface, or some other form of alert communication indicating that the stress on the capacitor has exceeded the first alert threshold.

In some embodiments, responsive to the second alert threshold (Alert2) being violated, the stress monitor module 214 identifies the second fault condition and initiates a protective action to reduce energy stress on the capacitor 112. In some embodiments, the stress monitor module 214 may reduce stress on the capacitor 112 by changing or sending a signal to the register 200 to change one or more of the regulation control parameters. In some embodiments, the finite state machine 206 controls the modulator 204 to inhibit the generation of the switching signals for the power stage 104, such as by grounding the switching signals. In some embodiments, the finite state machine 206 inhibits the operation of the control engine 202, such as by setting the control signal fed to the modulator 204 to a "0" value.

In some embodiments, the stress monitor module 214 clears the fault condition responsive to the stress energy metric being less than a reset threshold for a predetermined time period. In some embodiments, a user of the power converter 100 clears the fault condition by performing a system reset.

In some embodiments, the operation of the stress monitor module 214 is controlled by a mode indicator, such as enable flag. For example, an input may be received, such as by an external interface of the control engine 202, prior to initiating a tuning operation on the control engine 202 to set the mode indicator to an enable value. The stress monitor module 214 may operate as described in the enable mode. After the tuning has been completed another input may be received, such as by the external interface of the control engine 202, to set the mode indicator to a disable value. Operation of the stress monitor module 214 is inhibited in the disable mode. Disabling the stress monitor module 214 prevents alerts or disable events from being generated during a normal operating mode of the power converter 100.

Figure 3:
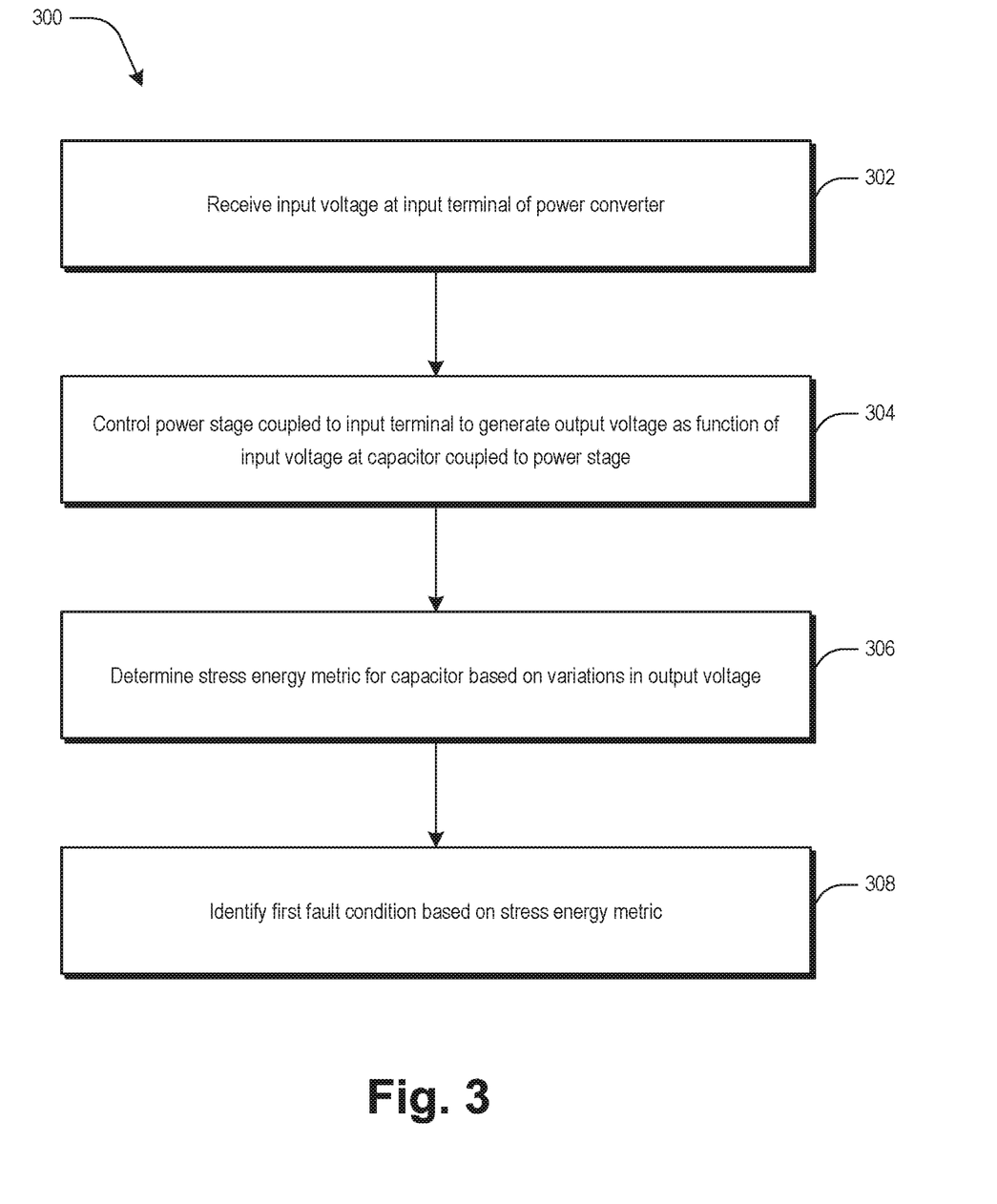
FIG. 3 is an illustration of an example method, according to some embodiments.

FIG. 3 illustrates a method 300 for controlling a power converter 100, according to some embodiments. At 302, an input voltage is received at an input terminal of a power converter 100. At 304, a power stage 104 coupled to the input terminal is controlled to generate an output voltage as a function of the input voltage at a capacitor 112 coupled to the power stage 104. At 306 a stress energy metric for the capacitor 112 is determined based on the output voltage. At 308, a first fault condition is determined based on the stress energy metric.

Figure 4:
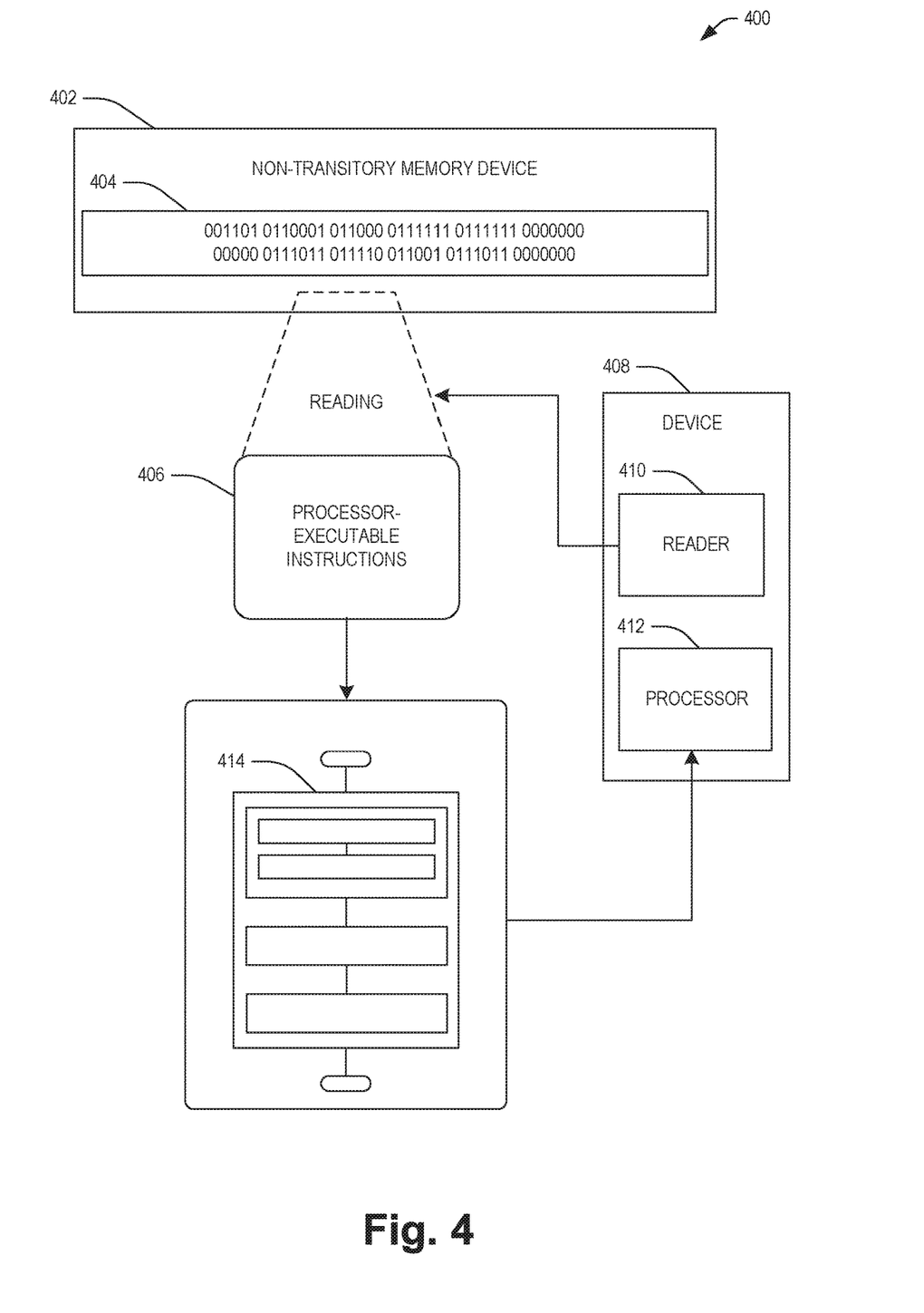
FIG. 4 illustrates an exemplary computer-readable medium, according to some embodiments.

FIG. 4 illustrates an exemplary embodiment 400 of a computer-readable medium 402, according to some embodiments. One or more embodiments involve a computer-readable medium comprising processor-executable instructions configured to implement one or more of the techniques presented herein. The embodiment 400 comprises a non-transitory computer-readable medium 402 (e.g., a CD-R, DVD-R, flash drive, a platter of a hard disk drive, etc.), on which is encoded computer-readable data 404. This computer-readable data 404 in turn comprises a set of processor-executable computer instructions 406 that, when executed by a computing device 408 including a reader 410 for reading the processor-executable computer instructions 406 and a processor 412 for executing the processor-executable computer instructions 406, are configured to facilitate operations according to one or more of the principles set forth herein. In some embodiments, the processor-executable computer instructions 406, when executed, are configured to facilitate performance of a method 414, such as at least some of the aforementioned method(s). In some embodiments, the processor-executable computer instructions 406, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment, a power converter is provided. The power converter may comprise an input terminal for receiving an input voltage, a power stage coupled to the input terminal, a capacitor coupled to the power stage, a controller configured to control the power stage to generate an output voltage at the capacitor as a function of the input voltage, and a stress monitor module configured to determine a stress energy metric for the capacitor based on variations in the output voltage and identify a first fault condition based on the stress energy metric.

In an embodiment, the stress monitor module is configured to disable the power stage responsive to identifying the first fault condition.

In an embodiment, the stress monitor module is configured to generate a fault message responsive to identifying the first fault condition.

In an embodiment, the stress monitor module is configured to identify a second fault condition based on the stress energy metric and disable the power stage responsive to identifying the second fault condition.

In an embodiment, the stress monitor module is configured to determine the stress energy metric responsive to a mode indicator having a first value and disable the determining of the stress energy metric responsive to the mode indicator having a second value.

In an embodiment, the stress monitor module is configured to determine the stress energy metric by determining a first stress energy parameter based on a first voltage change on the capacitor over a first time interval, determining a second stress energy parameter based on a second voltage change on the capacitor over a second time interval, and determining the stress energy metric by combining the first stress energy parameter and the second stress energy parameter.

In an embodiment, the first time interval occurs prior to the second time interval and combining the first stress energy parameter and the second stress energy parameter comprises weighting the second stress energy parameter less than the first stress energy parameter.

In an embodiment, a length of the first time interval corresponds to a switching frequency of the power stage.

In an embodiment, an apparatus is provided. The apparatus may comprise means for receiving an input voltage at an input terminal of a power converter, means for controlling a power stage coupled to the input terminal to generate an output voltage as a function of the input voltage at a capacitor coupled to the power stage, means for determining a stress energy metric for the capacitor based on variations in the output voltage, and means for identifying a first fault condition based on the stress energy metric.

In an embodiment, a method is provided. The method may comprise receiving an input voltage at an input terminal of a power converter, controlling a power stage coupled to the input terminal to generate an output voltage as a function of the input voltage at a capacitor coupled to the power stage, determining a stress energy metric for the capacitor based on variations in the output voltage, and identifying a first fault condition based on the stress energy metric.

In an embodiment, the method comprises disabling the power stage responsive to identifying the first fault condition.

In an embodiment, the method comprises generating a fault message responsive to identifying the first fault condition.

In an embodiment, the method comprises identifying a second fault condition based on the stress energy metric and disabling the power stage responsive to identifying the second fault condition.

In an embodiment, determining the stress energy metric comprises determining the stress energy metric responsive to a mode indicator having a first value, and the method comprises disabling the determining of the stress energy metric responsive to the mode indicator having a second value.

In an embodiment, determining the stress energy metric comprises determining a first stress energy parameter based on a first voltage change on the capacitor over a first time interval, determining a second stress energy parameter based on a second voltage change on the capacitor over a second time interval, and determining the stress energy metric by combining the first stress energy parameter and the second stress energy parameter.

In an embodiment, the first time interval occurs prior to the second time interval and combining the first stress energy parameter and the second stress energy parameter comprises weighting the second stress energy parameter less than the first stress energy parameter.

In an embodiment, a length of the first time interval corresponds to a switching frequency of the switching circuit.

In an embodiment, an apparatus is provided. The apparatus may comprise means for determining a first stress energy parameter representing power dissipated in a capacitor for a first time interval, means for determining a second stress energy parameter representing power dissipated in the capacitor for a second time interval, means for combining the first stress energy parameter and the second stress energy parameter to generate a stress energy metric for the capacitor, and means for controlling a power converter coupled to the capacitor based on the stress energy metric.

In an embodiment, a method is provided. The method may comprise determining a first stress energy parameter representing power dissipated in a capacitor for a first time interval, determining a second stress energy parameter representing power dissipated in the capacitor for a second time interval, combining the first stress energy parameter and the second stress energy parameter to generate a stress energy metric for the capacitor, and controlling a power converter coupled to the capacitor based on the stress energy metric.

In an embodiment, controlling the power converter comprises at least one of generating a fault message or disabling a power stage of the power converter responsive to the stress energy metric violating a first threshold.

In an embodiment, the first time interval occurs prior to the second time interval and combining the first stress energy parameter and the second stress energy parameter comprises weighting the second stress energy parameter less than the first stress energy parameter.

In an embodiment, the method comprises controlling a switching circuit of the power converter according to a switching frequency, wherein a length of the first time interval corresponds to the switching frequency.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

While the subject matter has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A power converter, comprising
an input terminal for receiving an input voltage;
a power stage coupled to the input terminal;
a capacitor coupled to the power stage;
a controller configured to control the power stage to generate an output voltage at the capacitor as a function of the input voltage; and
a stress monitor module configured to:
  determine a first stress energy parameter based on a first voltage change on the capacitor over a first time interval;
  discount the first stress energy parameter based on heat dissipated by the capacitor to generate a discounted stress energy parameter;
  determine a second stress energy parameter based on a second voltage change on the capacitor over a second time interval;
  determine a stress energy metric for the capacitor by combining the discounted stress energy parameter and the second stress energy parameter; and
  identify a first fault condition based on the stress energy metric.

2. The power converter of claim 1, wherein:
the stress monitor module is configured to disable the power stage responsive to identifying the first fault condition.

3. The power converter of claim 1, wherein:
the stress monitor module is configured to generate a fault message responsive to identifying the first fault condition.

4. The power converter of claim 1, wherein:
the stress monitor module is configured to identify a second fault condition based on the stress energy metric and disable the power stage responsive to identifying the second fault condition.

5. The power converter of claim 1, wherein:
the stress monitor module is configured to:
  determine the stress energy metric responsive to a mode indicator having a first value; and
  disable the determining of the stress energy metric responsive to the mode indicator having a second value.

6. The power converter of claim 1, wherein:
the first time interval occurs prior to the second time interval; and
the stress monitor module is configured to discount the first stress energy parameter by applying a weighting factor to the first stress energy parameter.

7. The power converter of claim 1, wherein:
a length of the first time interval corresponds to a switching frequency of the power stage.

8. A method, comprising:
receiving an input voltage at an input terminal of a power converter;
controlling a power stage coupled to the input terminal to generate an output voltage as a function of the input voltage at a capacitor coupled to the power stage;
determining a first stress energy parameter based on a first voltage change on the capacitor over a first time interval;
discounting the first stress energy parameter based on heat dissipated by the capacitor to generate a discounted stress energy parameter;
determining a second stress energy parameter based on a second voltage change on the capacitor over a second time interval;
determining a stress energy metric for the capacitor by combining the discounted stress energy parameter and the second stress energy parameter; and
identifying a first fault condition based on the stress energy metric.

9. The method of claim 8, comprising:
disabling the power stage responsive to identifying the first fault condition.

10. The method of claim 8, comprising generating a fault message responsive to identifying the first fault condition.

11. The method of claim 8, comprising:
identifying a second fault condition based on the stress energy metric; and
disabling the power stage responsive to identifying the second fault condition.

12. The method of claim 8, wherein:
determining the stress energy metric comprises determining the stress energy metric responsive to a mode indicator having a first value, and the method comprises:
  disabling the determining of the stress energy metric responsive to the mode indicator having a second value.

13. The method of claim 8, wherein:
the first time interval occurs prior to the second time interval; and
discounting the first stress energy parameter comprises applying a weighting factor to the first stress energy parameter.

14. The method of claim 8, wherein:
a length of the first time interval corresponds to a switching frequency of the switching circuit.

15. A method comprising:
determining a first stress energy parameter representing power dissipated in a capacitor for a first time interval;
discounting the first stress energy parameter based on heat dissipated by the capacitor to generate a discounted stress energy parameter;
determining a second stress energy parameter representing power dissipated in the capacitor for a second time interval;
combining the discounted stress energy parameter and the second stress energy parameter to generate a stress energy metric for the capacitor; and
controlling a power converter coupled to the capacitor based on the stress energy metric.

16. The method of claim 15, wherein:
controlling the power converter comprises at least one of generating a fault message or disabling a power stage of the power converter responsive to the stress energy metric violating a first threshold.

17. The method of claim 15, wherein:
the first time interval occurs prior to the second time interval; and
discounting the first stress energy parameter comprises applying a weighting factor to the first stress energy parameter.

18. The method of claim 15, comprising:
controlling a switching circuit of the power converter according to a switching frequency, wherein:
  a length of the first time interval corresponds to the switching frequency.

19. The power converter of claim 1, wherein the stress monitor module is configured to combine the discounted stress energy parameter and the second stress energy parameter using an exponentially weighted moving average.

20. The method of claim 8, wherein combining the discounted stress energy parameter and the second stress energy parameter comprises combining the discounted stress energy parameter and the second stress energy parameter using an exponentially weighted moving average.

* * * * *